(12) United States Patent
Bhattacharya et al.

(10) Patent No.: US 8,639,656 B2
(45) Date of Patent: Jan. 28, 2014

(54) METHOD FOR IMPLEMENTING PERSISTENT FILE PRE-ALLOCATION

(75) Inventors: Suparna Bhattacharya, Karnataka (IN); Mingming Cao, Portland, OR (US); David J. Kleikamp, Cedar Park, TX (US); Theodore Y. T. Tso, Medford, MA (US)

(73) Assignee: International Business Machines Corporation, Armonk, NY (US)

( * ) Notice: Subject to any disclaimer, the term of this patent is extended or adjusted under 35 U.S.C. 154(b) by 1765 days.

(21) Appl. No.: 11/670,539

(22) Filed: Feb. 2, 2007

(65) Prior Publication Data

US 2008/0189342 A1   Aug. 7, 2008

(51) Int. Cl.
*G06F 17/30* (2006.01)
*G06F 7/00* (2006.01)

(52) U.S. Cl.
USPC .......................................... 707/609; 707/694

(58) Field of Classification Search
USPC ................................ 707/1–10, 205, 609, 694
See application file for complete search history.

(56) References Cited

U.S. PATENT DOCUMENTS

| | | | |
|---|---|---|---|
| 5,960,446 A * | 9/1999 | Schmuck et al. | 707/205 |
| 6,571,259 B1 | 5/2003 | Zheng et al. | |
| 7,010,554 B2 | 3/2006 | Jiang et al. | |
| 7,072,981 B1 | 7/2006 | O'Rourke et al. | |
| 2005/0066095 A1 | 3/2005 | Mullick et al. | |
| 2005/0114594 A1 | 5/2005 | Corbett et al. | |
| 2005/0144501 A1 | 6/2005 | Kim et al. | |
| 2005/0240628 A1 | 10/2005 | Jiang et al. | |
| 2006/0031422 A1 | 2/2006 | Totolos | |
| 2006/0077894 A1 | 4/2006 | Schmuck et al. | |

OTHER PUBLICATIONS

Bhattacharya, S.; Silva, D. D.; "Toward a Highly Adaptable Filesystem Framework for Linux", 2006.

* cited by examiner

*Primary Examiner* — Jacob F Bétit
*Assistant Examiner* — John P Hocker
(74) *Attorney, Agent, or Firm* — Lieberman & Brandsdorfer, LLC

(57) ABSTRACT

A method and apparatus are provided for pre-allocating non-initialized blocks of data in a file system. Each file contains a primary i-node to maintain file metadata. A secondary i-node is created and associated with the primary i-node. The secondary i-node contains non-initialized data blocks, and the primary i-node contains valid and initialized data blocks. A write operation to a non-initialized data block in a pre-allocated range stored in the secondary i-node directs the data block from the secondary i-node to the primary i-node.

19 Claims, 9 Drawing Sheets

METHOD FOR IMPLEMENTING PERSISTENT FILE PRE-ALLOCATION

BACKGROUND OF THE INVENTION

1. Technical Field

This invention relates to allocation of data blocks in a file system. More specifically, the invention relates to persistent file pre-allocation with minimal overhead during read operations.

2. Description of the Prior Art

A file is a named collection of related information that appears to the user as a single contiguous block of data retained in storage media. Data blocks are structures used to store the actual data for the file. A file system is a structuring of data and metadata on storage media, which permits reading/writing of data on those media. In one embodiment, the file system is a hierarchy of directories, i.e. a directory tree that is used to organize files on a computer. An i-node is a data structure on a file system used to store information about a file, such as metadata. The information contained in an i-node may include ownership of the file, access permission for the file, size of the file, file type and references to locations on disk of the data blocks for the file. Such information is sometimes referred to as file metadata. An i-node contains some direct pointers that are pointers to a file system's logical blocks used by the file it belongs to. I-nodes also contain indirect pointers, double-indirect pointers, and triple-indirect pointers. Indirect pointers are pointers to blocks where other pointers to logical blocks are stored. Double-indirect pointers are pointers to blocks that contain indirect pointers, triple-indirect pointers point to blocks containing double indirect pointers, etc.

I-nodes are often stored in a contiguous table on disk media, and the i-node number of a file is an integer that is the index of its i-node in this table. When a file is created, it is assigned both a name and an i-node number. The file has an i-node number by virtue of being rooted in an I-node, and it has a name by virtue of having an entry created for it in a directory. The data in a directory is minimally a list of pairs of file names along with their corresponding i-node numbers, noting that directories will themselves have entries in a parent directory—that is, most directories are sub-directories of some other directory. Only the root directory of a file system has no explicit parent directory in the file system. Whenever a user or a program refers to a file by name, the system uses that name to search directories in the file system. The search begins with the root and successively reads and searches subdirectories, until the file's complete name has been used and the search finds the i-node for the file, which enables the system to obtain the information it needs about the file, i.e. metadata, to perform further operations.

There is a desire to pre-allocate data blocks for a file without having to initialize the blocks. This helps ensure a contiguous allocation for a file irrespective of the order in which the file is written. In addition, it guarantees space allocation for writing to a file within the pre-allocated size. One prior art approach for pre-allocating data blocks is known as a reservation based approach and sets aside, i.e. reserves blocks, in the file system to ensure a guaranteed pre-allocation without actually allocating and mapping specific blocks to the file. FIG. 1 is a flow chart (100) demonstrating one form of the reservation based pre-allocation approach. Initially, a determination is conducted as to whether the data block is allocated, i.e. set aside, in the i-node to store data in a write process and to provide data in a read process (102). If the response to the determination at step (102) is positive, the application proceeds to write data to the allocated data block (104). However, if the response to the determination at step (102) is negative, a subsequent determination is conducted as to whether the file has a reservation count remaining (106). A reservation count is a quantity of blocks that may have been set aside in reserve in the file system for future allocation. If the response to the determination at step (106) is positive, a new block is allocated from the i-node to the file, with the new block being allocated from one or more reserved blocks in the file system (108). Following step (108), the reservation count of reserved blocks in the file system is decremented (110) to account for the allocation at step (108), and the application proceeds to write data to the allocated data block(s) (102). However, if the response to the determination at step (106) is negative, a new block is allocated in the i-node from free blocks present in the file system (112). Following step (112), the application proceeds to step (104) to write data to the data block(s). As shown, the blocks are pre-allocated in the file system without actually allocating and mapping specific blocks to the file. However, one of the limitations of this prior art process for reserving data blocks for future allocation is that this prior art process does not ensure contiguity of the block allocation since it is not an actual pre-allocation of blocks for the given file.

The flow chart of FIG. 1 illustrates a prior art process for writing data to a file in association with reserved data blocks that may not be identified in the i-node. In addition, to writing data to a file, another common task is to read data from a file. Since the reserved data blocks are not referenced by the file until the blocks are written to, no additional processing is needed in the read process.

Another prior art implementation involves defining a high water mark which indicates the offset within a file where the last data is written. Any data blocks preceding the high water mark are initialized, and any data blocks beyond the high water mark are un-initialized. Any write to an un-initialized data block must move the high water mark to the end of the write, and any previous un-initialized data blocks must be overwritten with zeroes. This approach works well if a file is written sequentially, but the cost of zeroing intervening data blocks can result in a significant performance penalty when a file is written in a random order.

A third prior art approach uses a data structure in the i-node that not only identifies the data blocks for the file, but a flag indicating whether or not the data is initialized. In this implementation, writing data to an un-initialized block results in changing the flag to indicate that the data block contains valid data. One limitation of this approach is that it requires a significant change to an existing file system's format, such that it may not be possible to add this implementation to an existing file system.

FIG. 2 is a flow chart (200) that illustrates a prior art approach for reading data blocks in relation to the i-node when using validity detection based approaches like the high watermark or flag indicating uninitialized blocks as described above. Initially, a read command for one or more specified data blocks is identified (202). Thereafter, a determination is conducted as to whether the data block(s) specified at step (202) is allocated, i.e. set aside, in an i-node to store data in a write process and to provide data in a read process (204). If the response to the determination at step (204) is negative, a buffer filled with zeros is returned to the requesting command (206) indicating that the allocated data block(s) specified at step (202) has not yet been written to. In other words, the data block requested in the read command is identified in the i-node but has not received data through a write process. However, if the response to the determination at step (204) is positive, a determination is conducted as to the validity of the data allocated in the i-node, i.e. it is determined whether the requested data block in the i-node contains valid data (208). In the case of the high watermark based approach, this would involve checking if the data block is below the high watermark. In the case of the approach involving a data structure with a flag indicating uninitialized blocks, this would involve checking the value of the flag for the data block. If it is determined at step (208) that the data in the i-node is not valid, a zero filled buffer is returned to the requesting command (206) indicating that the requested data block(s) is either invalid or not allocated in the i-node. However, if it is determined at step (206) that the requested block in the i-node contains valid data, the requesting application reads and returns the requested data block contents (210). One of the limitations shown herein is the requirement to conduct a validity check when the file is read to avoid returning stale data. The validity check affects efficiency associated with the read command. Other limitations with the prior art read procedure include backwards incompatibility.

As shown herein, the prior art solutions for pre-allocating data blocks have limitations, including issues with backward compatibility associated with reading data blocks, and maximizing data block contiguity on writing to one or more data blocks. Therefore, there is a need for providing support for pre-allocating data blocks to an existing file system that overcomes the limitations of the prior art.

SUMMARY OF THE INVENTION

This invention comprises a method, system, and article of manufacture for persistent pre-allocation of data blocks in a file system.

In one aspect of the invention, a first i-node is maintained in the file system for a specific file. The first i-node is maintained in the file system for each file to manage file operations and includes initialized blocks. A second i-node is maintained in the file system for the specific primary i-node. The second i-node has pre-allocated non-initialized blocks. The first i-node is associated with the second i-node through a mapping technique. Corresponding blocks are transferred from the second i-node to the first i-node in response to a write operation requiring un-initialized blocks in a pre-allocated range of blocks.

In another aspect of the invention, a computer system is provided with a file system to log metadata. A first i-node is provided in the file system to manage file operations. In one embodiment, each file has a first i-node. The first i-node has initialized blocks. A second i-node is provided in the file system for a specified first i-node. The second i-node has pre-allocated non-initialized blocks. An allocation manager is provided in the file system to establish an association of the first i-node with the second i-node. The allocation manager directs transfer of blocks from the second i-node to the first i-node in response to a requirement for un-initialized blocks in a pre-allocated range of blocks present on the second i-node in a write operation.

In a further aspect of the invention, an article of manufacture is provided with a file system to log metadata. The article includes a tangible computer readable carrier including computer program instructions are configured to pre-allocate data blocks in conjunction with a first i-node to manage file operations and a second i-node having pre-allocated non-initialized blocks. Instructions are provided to associate the first i-node with the second i-node through a mapping technique. In addition, instructions are provided to transfer corresponding blocks from the second i-node to the first i-node in response to a write operation requiring non-initialized blocks in a pre-allocated range of blocks absent from the first i-node.

In yet another aspect of the invention, a method is provided for persistent pre-allocation of data blocks. A primary i-node is maintained to manage file operations. The primary i-node has a contiguous set of mapped data blocks. The primary i-node is backed by a first level secondary i-node for mapping initialized data blocks in a pre-allocated range, and the first level secondary i-node is backed by a second level secondary i-node for mapping pre-allocated non-initialized data blocks. The primary i-node is associated with the first level secondary i-node, and the first level secondary i-node is associated with the second level secondary i-node through a mapping technique. Corresponding data blocks are transferred from the second level secondary i-node to the first level secondary i-node, and a contiguous set of initialized pre-allocated data blocks are transferred from the first level secondary i-node to the primary i-node in response to a write operation.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

A primary i-node is provided in a file system to manage allocation of data blocks by logging file metadata. The primary i-node contains valid and initialized blocks together with any necessary index blocks, such as indirect blocks and double indirect blocks, with NULL mappings. In one embodiment, each file in the file system has its own primary i-node. A secondary i-node is created in the file system for a specified file and is associated with the primary i-node for the specified file. This second i-node, also referred to as a secondary i-node, contains pre-allocated blocks for the mapped file at appropriate offsets. The secondary i-node can be associated with the primary i-node via system attributes or implicit mapping. The blocks in the secondary i-node are not initialized. Regular file operations take effect mainly on the primary i-node, while pre-allocation takes affect mainly on the secondary i-node. Read and write operations to valid blocks use the mappings in the primary i-node and do not require any validity checks to ascertain whether the data is stale. However, a write operation to a non-initialized block that lies in a pre-allocated range requires support of the secondary i-node. More specifically, the secondary i-node transfers or re-maps corresponding blocks from the secondary i-node to the primary i-node.

Technical Details

In a computing environment, a file system is a method for storing and organizing file and associated data. Most operating system have a file system as an integral element thereof. It is known in the art for file systems to have one or more objects to represent a file. For example, in the Linux operating system, one or more i-nodes are provided to store information about a file. Hereinafter, the detailed description will refer to a file system on the Linux operating system, however, it is understood that the invention may apply to other operating systems and their associated file systems.

Ext2 and Ext3 are extended file systems available for the Linux kernel. Ext3 is a similar file structure to the Ext2 file system, with the exception that Ext2 is not a journalled file system. A journalled file system is a file system that logs changes to a journal before actually writing the changes to the main file system. In the event of a failure, the log can be used in a recovery. Journaling requires all data to be written twice. The advantage of the Ext2 and Ext3 file systems is that there is compatibility between the two systems. In one embodiment, the creation and association of the secondary i-nodes with the primary i-nodes may be utilized in the Linux Ext2 or Ext3 file systems. For the purpose of discussion, the invention will hereinafter be described with reference to the Ext3 file system.

Figure 1:
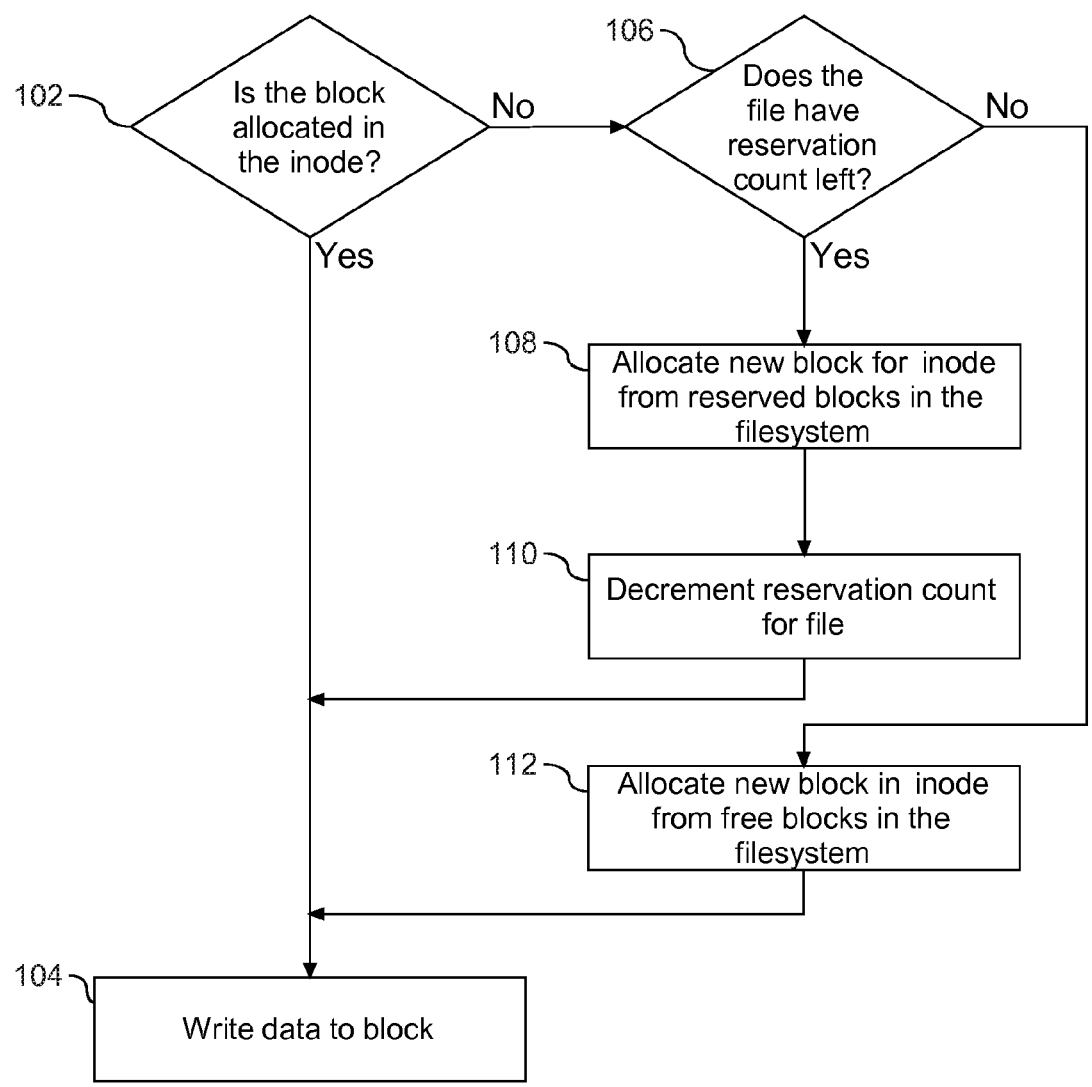
FIG. 1 is a flow chart of a prior art reservation based pre-allocation.
Figure 2:
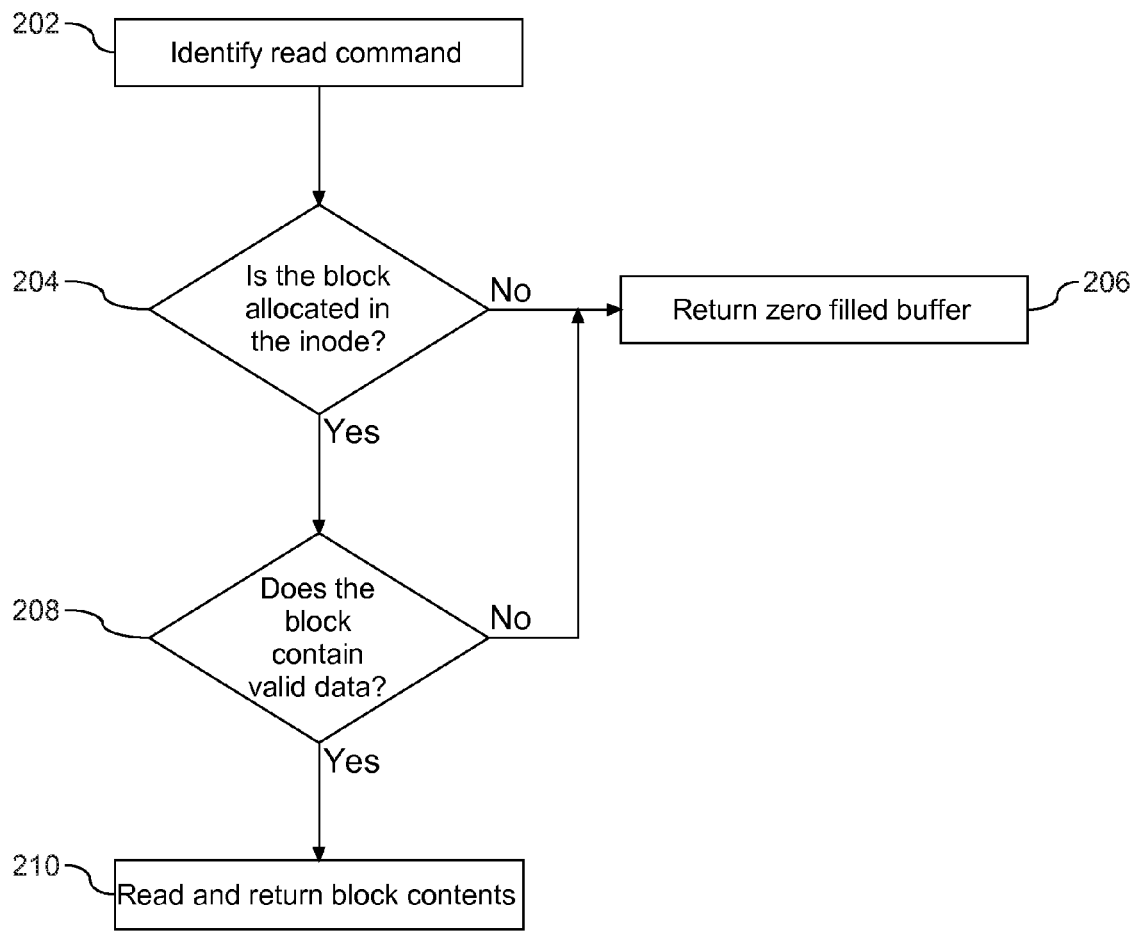
FIG. 2 is a flow chart of prior art for pre-allocation support using a validity detection based process for reading data blocks in relation to the i-node.
Figure 3:
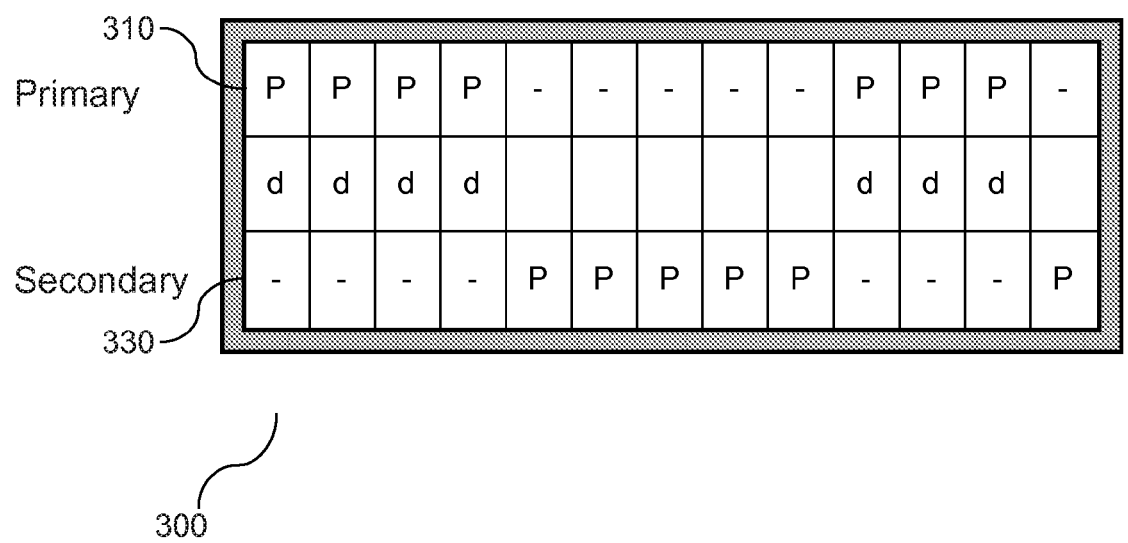
FIG. 3 is a block diagram illustrating mapping of blocks on both the primary i-node and the secondary i-node.

FIG. 3 is a block diagram (300) illustrating how mapping of blocks may appear on both the primary i-node (310) and the secondary i-node (330) after some of the blocks in the file system have been written to. The letter "d" identifies blocks that have been written to and contain valid data. The letter "P" identifies mapping entries that point to allocated file system blocks. This illustration is an example of block mapping between the primary i-node (310) and the secondary i-node (330).

The following flow charts illustrated creation and utilization of block mapped secondary i-nodes to manage allocation of data blocks. However, the invention should not be limited to block mapped secondary i-nodes. In one embodiment, the invention may be applied to an extent mapped i-node wherein data blocks are referenced in contiguous sets, with each set defined by a starting block address for that set and a length of the set.

Figure 4:
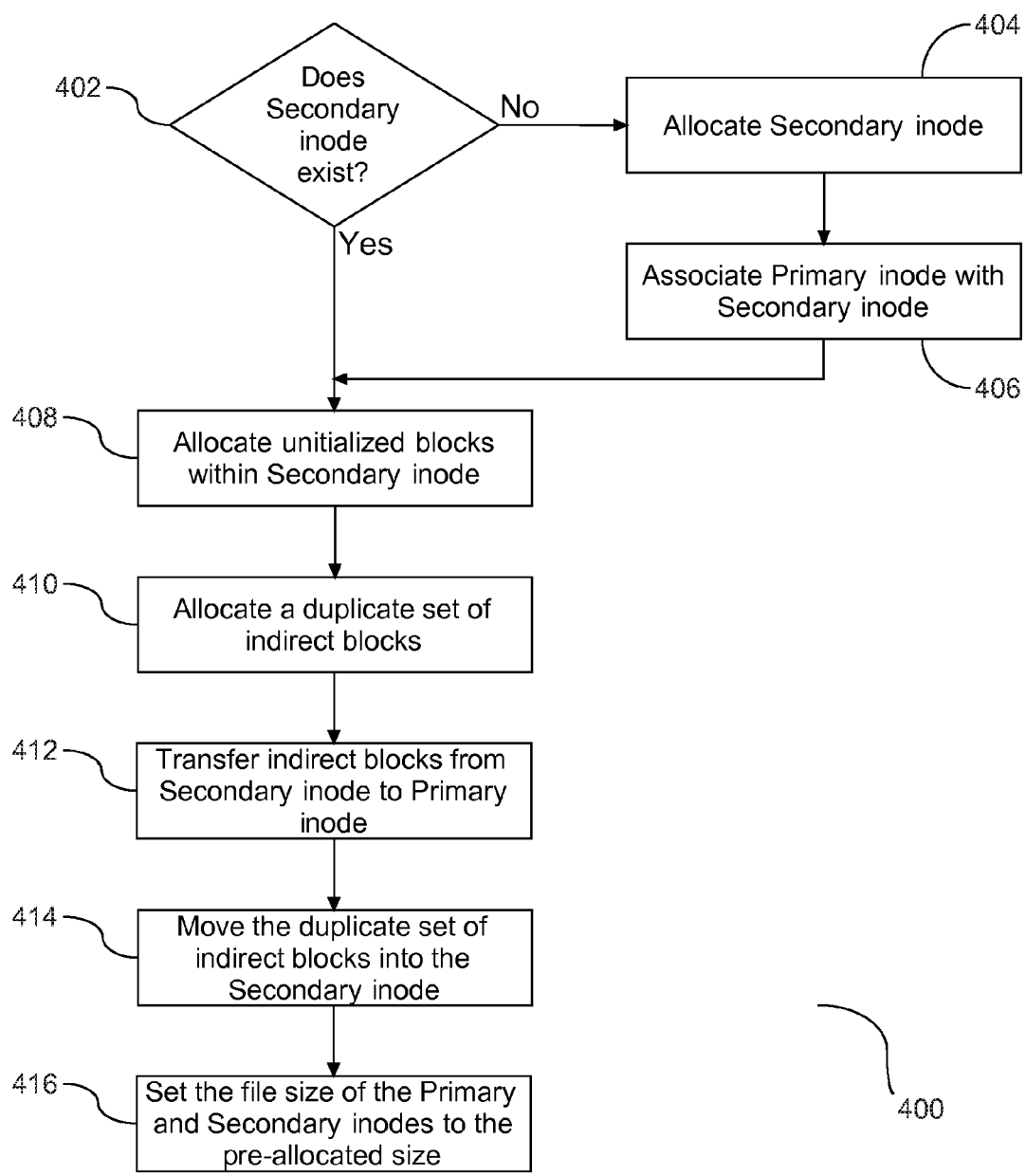
FIG. 4 is a flow chart illustrating a process for pre-allocation by associating a secondary i-node with a primary i-node.

As noted above, a secondary i-node is provided in the file system to manage pre-allocation of data blocks. The secondary i-node is created in the file system for a specified file to set aside data blocks for write operations. FIG. 4 is a flow chart (400) illustrating a process for allocating pre-allocated data blocks in a secondary i-node and for associating a secondary i-node with a primary i-node if there is not a prior associated secondary i-node. In one embodiment, the secondary i-node is not provided for a file until a pre-allocation operation is initiated for the file. Initially, it is determined whether a secondary i-node exists for a specific file (402). If the response to the determination at step (402) is negative, a secondary i-node for the specified file is allocated (404), and the primary i-node is associated with the secondary i-node (406). In one embodiment, the primary i-node is associated with the secondary i-node via system extended attributes or through an implicit mapping. Following step (406) or a positive determination at step (402) a range of non-initialized blocks are allocated to the secondary i-node (408). The range of allocated blocks begins at an offset corresponding to the end of the file of the associated primary i-node. In one embodiment, the range of data blocks pre-allocated to the secondary i-node is allocated through a get-blocks ( ) instruction which may include index blocks, such as indirect, double indirect, and triple indirect blocks. Following step (408) a duplicate set of indirect blocks are allocated to the primary i-node (410), followed by a transfer of the indirect blocks from the secondary i-node to the primary i-node (412). Thereafter, the duplicate set of indirect blocks in the primary i-node is moved to the secondary i-node (414). The swap movement of the indirect blocks and the duplicate set of indirect blocks between the primary and secondary i-nodes ensure that the resulting combination of regular and indirect block allocations on the primary i-node will result in an optimal layout. The index blocks initially contain a NULL mapping—meaning the index blocks initially do not contain the address(es) of any data blocks. Following the swap of the indirect blocks between the i-nodes, the file size of the primary and secondary i-nodes is set to reflect the pre-allocated size of the secondary i-node (416). In one embodiment, the secondary i-node is provided with an attribute to support recognition of the secondary i-node by the file system. Accordingly, the process of associating a secondary i-node with a primary i-node includes creating a secondary i-node for a specific file, establishing a relationship between the primary and secondary i-nodes for the specific file, and allocating pre-allocated data blocks in the secondary i-node.

Figure 5:
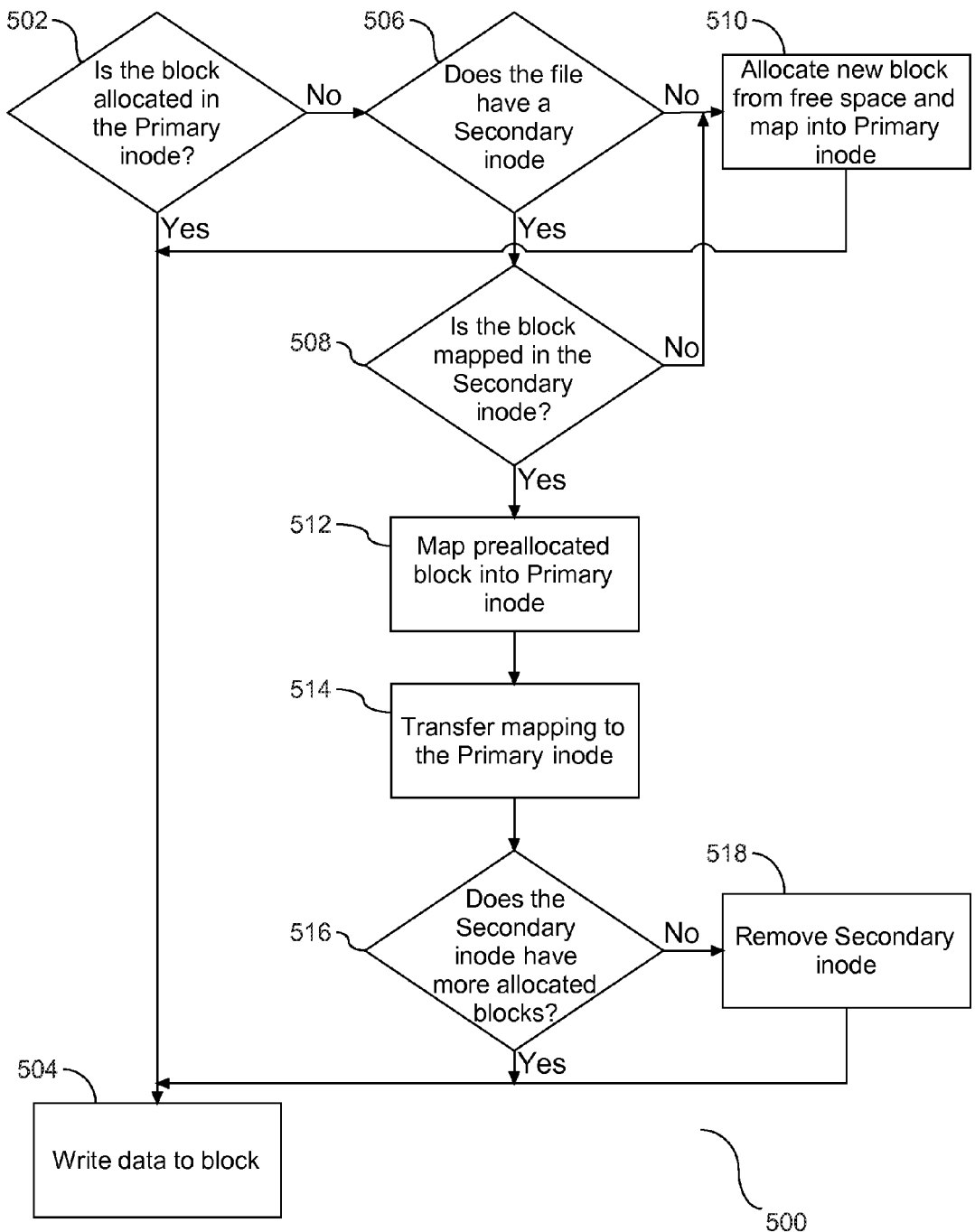
FIG. 5 is a flow chart illustrating a process for writing to a file in conjunction with consideration of a presence of a secondary i-node in communication with the primary i-node of the file according to the preferred embodiment of this invention, and is suggested for printing on the first page of the issued patent.

Reading blocks of data and writing to blocks in a file system that is configured with an established secondary i-node as described above, needs to account for pre-allocation of blocks in the secondary i-node. The process of writing to a file utilizes the secondary i-node in limited circumstances to supplement the primary i-node when a block necessary for the write operation is not allocated in the primary i-node. FIG. 5 is a flow chart (500) illustrating a process for writing to a file in conjunction with consideration of the presence of a secondary i-node in communication with the primary i-node of the file. The process of writing to a file proceeds with the use of the primary i-node. The differences in the write procedures stem from the non-existence of a block being written to, which require allocation of the block. The first step in the write process is a determination as to whether the block being written to in the file is allocated in the primary i-node (502). If the response to the determination at step (502) is positive, the application writes data to the allocated block (504). However, if the response to the determination at step (502) is negative, this is an indication that a block allocation is necessary. Once it has been determined that a block allocation is necessary, it is determined whether the associated file has a secondary i-node (506). If the response to the determination at step (506) is positive, a subsequent determination is conducted as to whether the block being written to in the file is mapped to the secondary i-node (508). A negative response to the determinations at either step (506) or step (508) will result in allocating a new block from a free space map in the file system and mapping the new block allocation into the primary i-node (510). Following the mapping of the new block allocation, the application writes data to the allocated block(s) (504). Accordingly, if during a write procedure it is determined that a specific file is not mapped to a secondary i-node; a block allocation is provided through the file system free space map.

However, a positive response to the determination at step (508) is an indication that a block allocation is needed, and the required block is within the pre-allocated file size in the secondary i-node. The corresponding block is located in the secondary i-node (512), and the mapping for the corresponding block is transferred to the primary i-node (514). The transfer at step (514) is in contrast to the fresh allocation from the file system free space map that occurs at step (510). In one embodiment, prior to step (512) a sanity check is conducted to validate the existence of the secondary i-node. Similarly, in one embodiment, the mapping transfer may include changing a pointer in the primary i-node to the block and removing the pointer to the block that existed in the secondary i-node. Following step (514), a determination is made as to whether or not the secondary i-node includes any remaining allocated blocks (516). If the response to the determination at step (516) is negative, the secondary i-node is removed from the file system (518). Following step (518) or a positive response to the determination at step (516), data is written to the allocated block as per normal write operations on the primary i-node (504). Accordingly, the process of writing to a file utilizes the secondary i-node in limited circumstances to supplement the primary i-node when a block necessary for the write operation is not allocated in the primary i-node.

Figure 6:
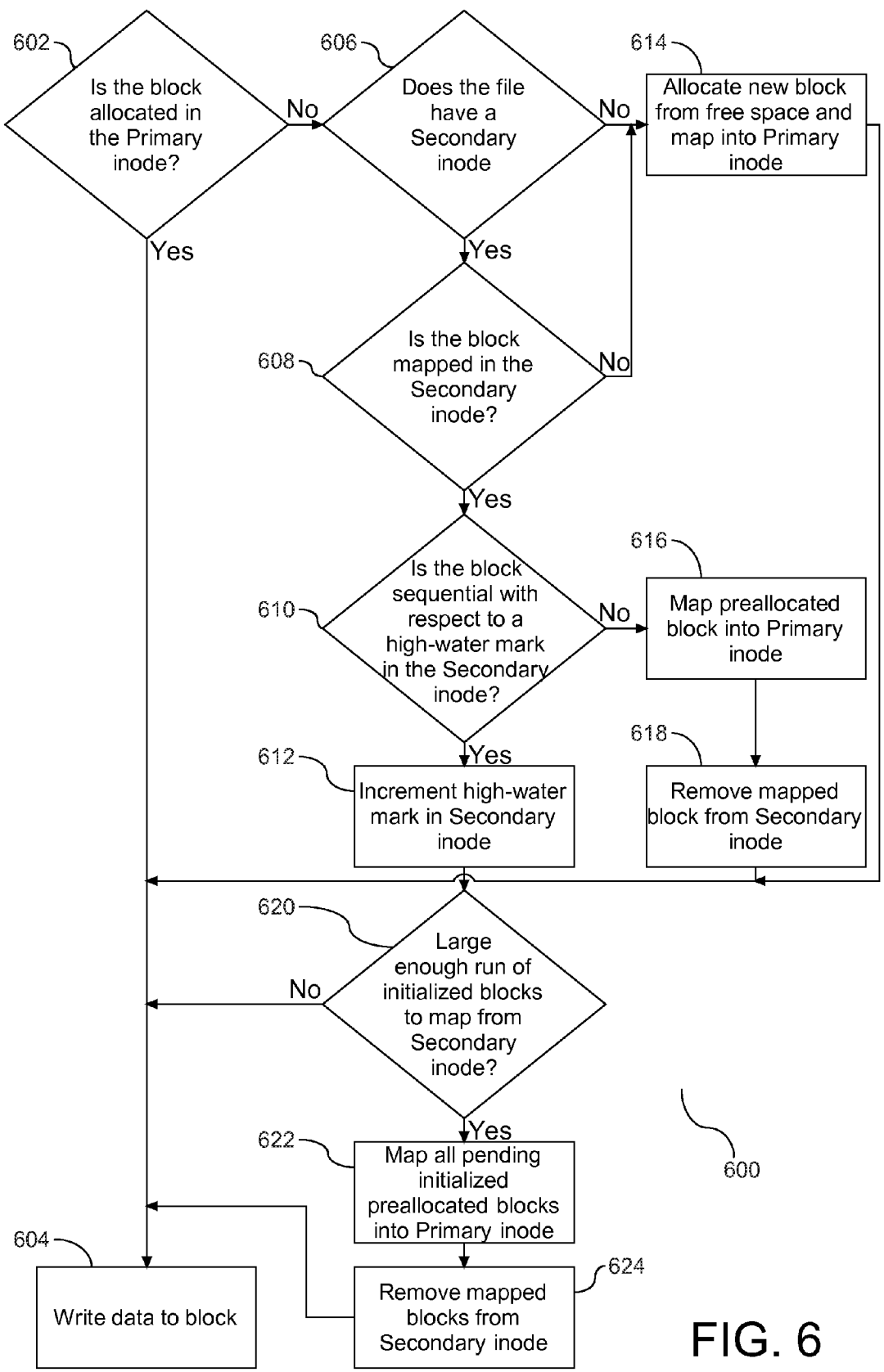
FIG. 6 is a flow chart illustrating an alternative process for a deferred block transfer from the secondary i-node to the primary i-node during a write procedure.

The process of writing to a file utilizes the secondary i-node for block allocation if the block is not allocated in the primary i-node. FIG. 6 is a flow chart (600) illustrating an alternative process for a deferred block transfer from the secondary i-node to the primary i-node during a write procedure. The first step in the deferred block transfer is a determination as to whether the target or selected block being written to in the file is allocated in the primary i-node (602). If the response to the determination at step (602) is positive, the application writes data to the allocated block (604). However, if the response to the determination at step (602) is negative, this is an indication that a block allocation is necessary. Once it has been determined that a block allocation is necessary, it is determined whether the primary i-node of the associated file has a secondary i-node (606). If the response to the determination at step (606) is positive, it is subsequently determined whether the requested block is mapped to the secondary i-node (608). A negative response to the determinations at step (606) or (608) results in an allocation of a new block from the file system free space, and mapping of the new block into the primary i-node (614). Following the allocation at step (614), the application writes data to the allocated block (604). However, if the response to the determination at step (608) is positive, a subsequent determination is conducted as to whether the block mapped to the secondary i-node is sequential with respect to a high watermark in the secondary i-node (610). In one embodiment, a high water mark is an indicator that specifies an offset at which all of the blocks below that offset have been written to and contain valid data. Accordingly, this indicator can only increase in value. If the response to the determination at step (610) is negative, the pre-allocated block is mapped into the primary i-node (616) and the application writes data to the allocated block (604). In one embodiment, if there are no more pre-allocated blocks remaining in the secondary i-node, then the secondary i-node may be removed from the file system (618). In contrast, if the response to the determination at step (610) is positive, the high watermark in the secondary i-node is incremented (612), followed by a determination as to whether the secondary i-node contains a sufficient quantity of contiguous initialized blocks pending transfer from the secondary i-node to the primary i-node (620). If it is determined at step (620) that a sufficient quantity of contiguous initialized blocks are available in the secondary i-node, all of these blocks are mapped from the secondary i-node to the primary i-node (622). In one embodiment, the mapping at step (622) may include all of the blocks remaining in the secondary i-node. Following step (622) or a negative response to the determination at step (620), the application writes data to the allocated block (604).

As illustrated above, a secondary i-node is utilized for allocation of contiguous blocks. Each primary i-node in a file system is connected to the directory tree. In one embodiment, secondary i-node(s) are connected to the directory tree through the primary i-node(s). Primary i-nodes that become disconnected from the directory tree are transferred to a lost and found directory for potential deletion or salvage by a system administrator. However, with the advent of the secondary i-node(s), it is important that the secondary i-node(s) not be confused with disconnected primary i-node(s) and connected to the lost and found directory. If the secondary i-node(s) is placed in the lost and found directory, any non-initialized blocks stored in the secondary i-node(s) become available to a system administrator who may consider the non-initialized blocks for deletion or for a usage not contemplated in the pre-allocation.

Figure 7:
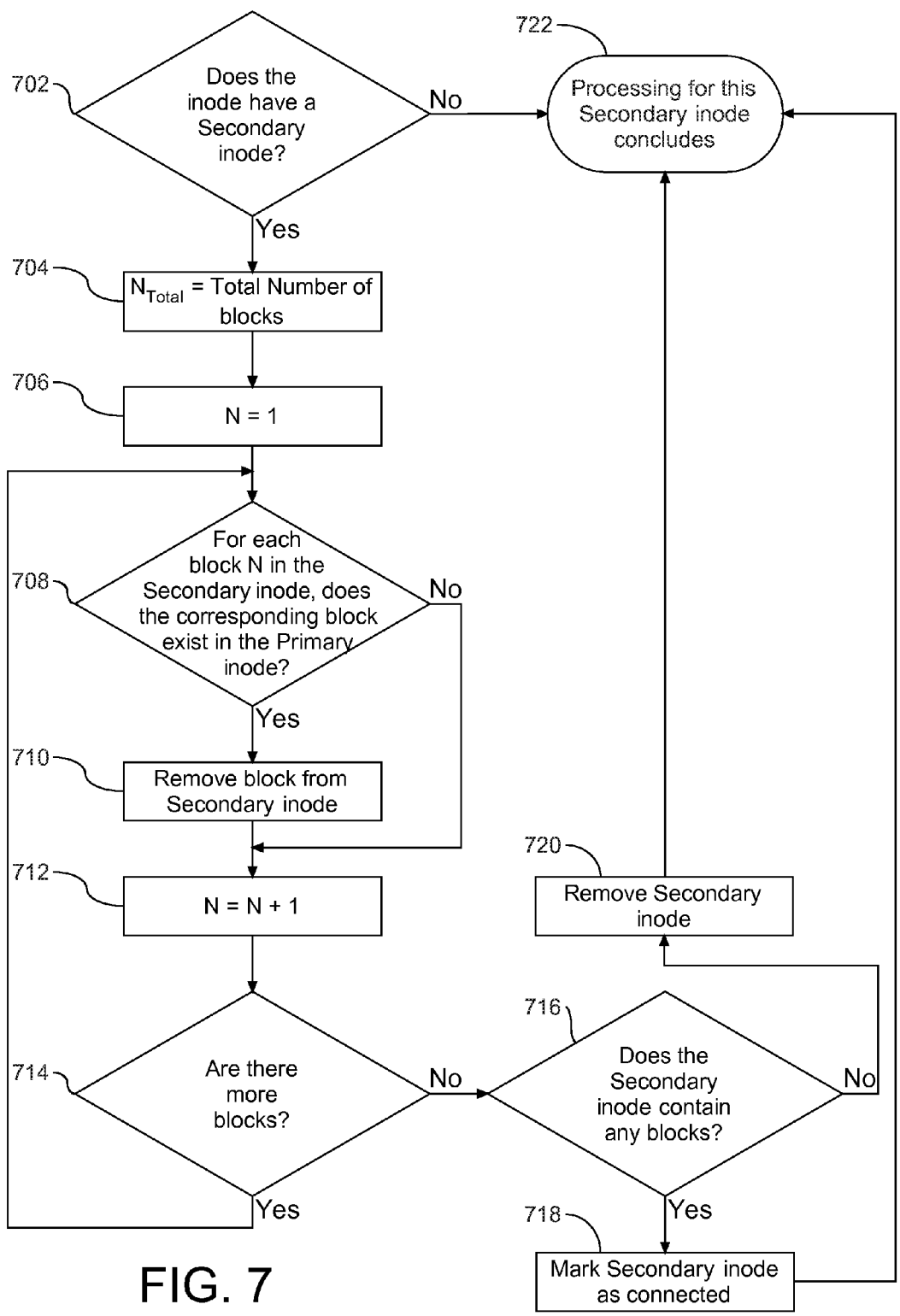
FIG. 7 is a flow chart illustrating a file system checker allowing the secondary i-nodes to be disconnected from the directory tree of the file system, and to verify the consistency between the primary and secondary i-nodes.

FIG. 7 is a flow chart (700) illustrating a tool to allow the secondary i-nodes to be disconnected from the directory tree of the file system, and to verify the consistency between the primary and secondary i-nodes. In a prior art file system that is limited to primary i-nodes and does not have the support structure for one or more secondary i-nodes, all i-nodes that are determined to be disconnected from the directory tree are marked as potential candidates for either salvaging and reconnecting to the directory tree or removal from the file system. However, in the modified file system with primary and secondary i-nodes, the file system tool that evaluates connection of an i-node to the file system needs to be modified to accommodate the secondary i-node. Initially, the tool determines if the primary i-node subject to evaluation and connected to the file system directory has a secondary i-node (702). If the determination is positive, the variable $N_{total}$ is set to the total number of blocks assigned to the secondary i-node (704), and the variable N is set to the integer 1 (706). For each block$_N$ in the secondary i-node's allocation, it is determined if the corresponding block exists in the primary i-node (708). If the response to the determination at step (708) is positive, the corresponding block is removed from the secondary i-node (710) as there is no need for a redundant allocation in the secondary i-node. Following step (710) or a negative response to the determination at step (708), the variable N is incremented (712), followed by a test to determine if there are remaining blocks that need to be queried for presence in the primary i-node (714). In one embodiment, this test is in the form of determining if the variable N is greater than $N_{total}$. A positive response to the determination at step (714) will return to step (708). However, a negative response to the determination at step (714) is an indication that all of the blocks in the secondary i-node have been evaluated and removed from the secondary i-node. Accordingly, the first part of the file system review is to remove all blocks in a secondary i-node that are present in the corresponding primary i-node.

Following the evaluation and removal of duplicate blocks from the secondary i-node, it is determined if the secondary i-node contains any blocks (716). In one embodiment, the blocks remaining in the secondary i-node are blocks that are not duplicated in the primary i-node. If the response to the determination at step (716) is positive, the secondary i-node is marked as connected to the file system (718). However, if the determination at step (716) is negative, the secondary i-node is removed from the file system (720). Following a negative response to the determination at step (702) or after removal at step (720) processing for this secondary i-node concludes (722). Accordingly, the file system check is employed to remove any secondary i-nodes that are empty or may be disconnected from the file system.

In one embodiment, the invention is implemented in software, which includes but is not limited to firmware, resident software, microcode, etc. The invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

Figure 8:
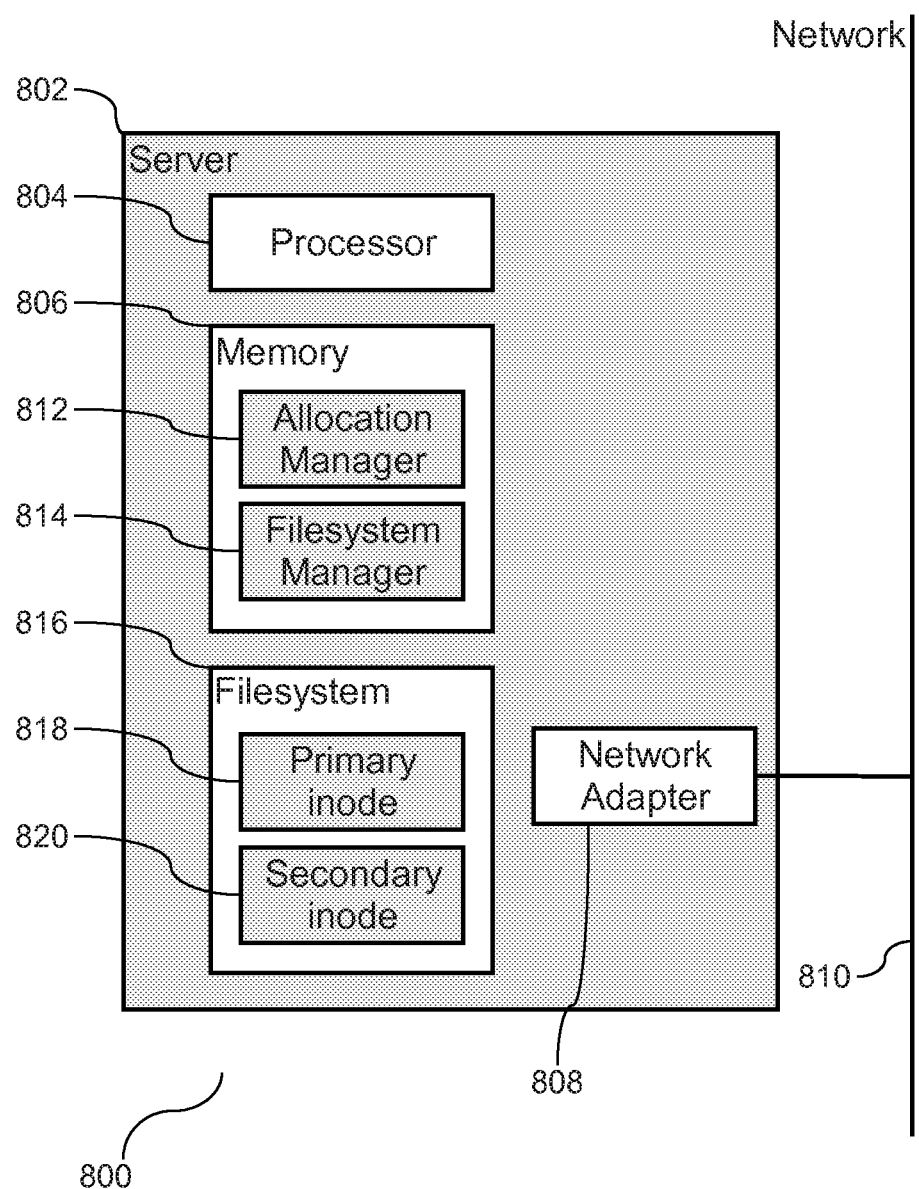
FIG. 8 is a block diagram illustrating placement of an allocation manager in a computer system.

FIG. 8 is a block diagram (800) illustrating placement of an allocation manager and a file system manager in a computer system. The illustration shows a server (802) with a processor (804), memory (806), and a network adapter (808) in communication with a network (810). In one embodiment, the server (802) is responsible for management of a file system (816) in a distributed computer system. The server (802) communicates across the network (810). Memory (806) includes an allocation manager (812) and a file system manager (814). The file system manager (814) is responsible for creating secondary i-nodes in the file system (816) for a specified file. The allocation manager (812) is responsible for associating the primary i-node with the created secondary i-node. In one embodiment, the file system (816) includes a plurality of files, with each file having a primary i-node and an associated secondary i-node. In the example illustrated herein, the file system (816) is shown with an exemplary primary i-node (818) and an associated secondary i-node (820). Both the allocation manager (812) and the file system manager (814) are shown residing in memory (806) of the computer (802). The file system manager (814) may utilize instructions in a computer readable medium to create a secondary i-node for a specified file if it is found to be absent from the file system. In addition, the allocation manager (812) may establish an association between the primary and secondary i-nodes for a specified file. When a request is received for a set of non-initialized blocks in a pre-allocated range of blocks, the allocation manager (812) directs a transfer of the blocks from the secondary i-node to the primary i-node. In one embodiment, the allocation manager (812) may validate the presence of the secondary i-node in the file system prior to transfer of a range of pre-allocated blocks to the primary i-node. Similarly, in one embodiment, the allocation manager (812) and the file system manager (814) may reside as hardware tools external to memory (806). Accordingly, the managers (812) and (814) may be implemented as a software tool or a hardware tool to facilitate creation and management of a secondary i-node in a file system.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks.

The software implementation can take the form of a computer program product accessible from a computer-useable or computer-readable medium providing program code for use by or in connection with a computer or any instruction execution system.

Advantages Over the Prior Art

The configuration and association of the secondary i-node with the primary i-node for specified files provides the ability to pre-allocate blocks of data for a file without having to initialize the blocks. This helps ensure contiguous allocation of blocks irrespective of when and in what order data is actually written to the blocks. In addition, the use of the secondary i-node provides a guaranteed space allocation for write operations that are within the size of the pre-allocation of blocks in the secondary i-node. Accordingly, pre-allocation takes effect mainly on the secondary i-node, while regular file operations take effect mainly on the primary i-node.

Another benefit of having all of the un-initialized data belonging to the secondary i-node is backward-compatibility. A file system with un-initialized data blocks belonging to a secondary i-node could be mounted on an older system which does not support this feature. The older system would correctly have access to all of the initialized data blocks, but the un-initialized data blocks would not appear to be associated with the file. The secondary i-nodes would not be accessible by the older system, since they are not directly connected to the directory tree.

Alternative Embodiments

Figure 9:
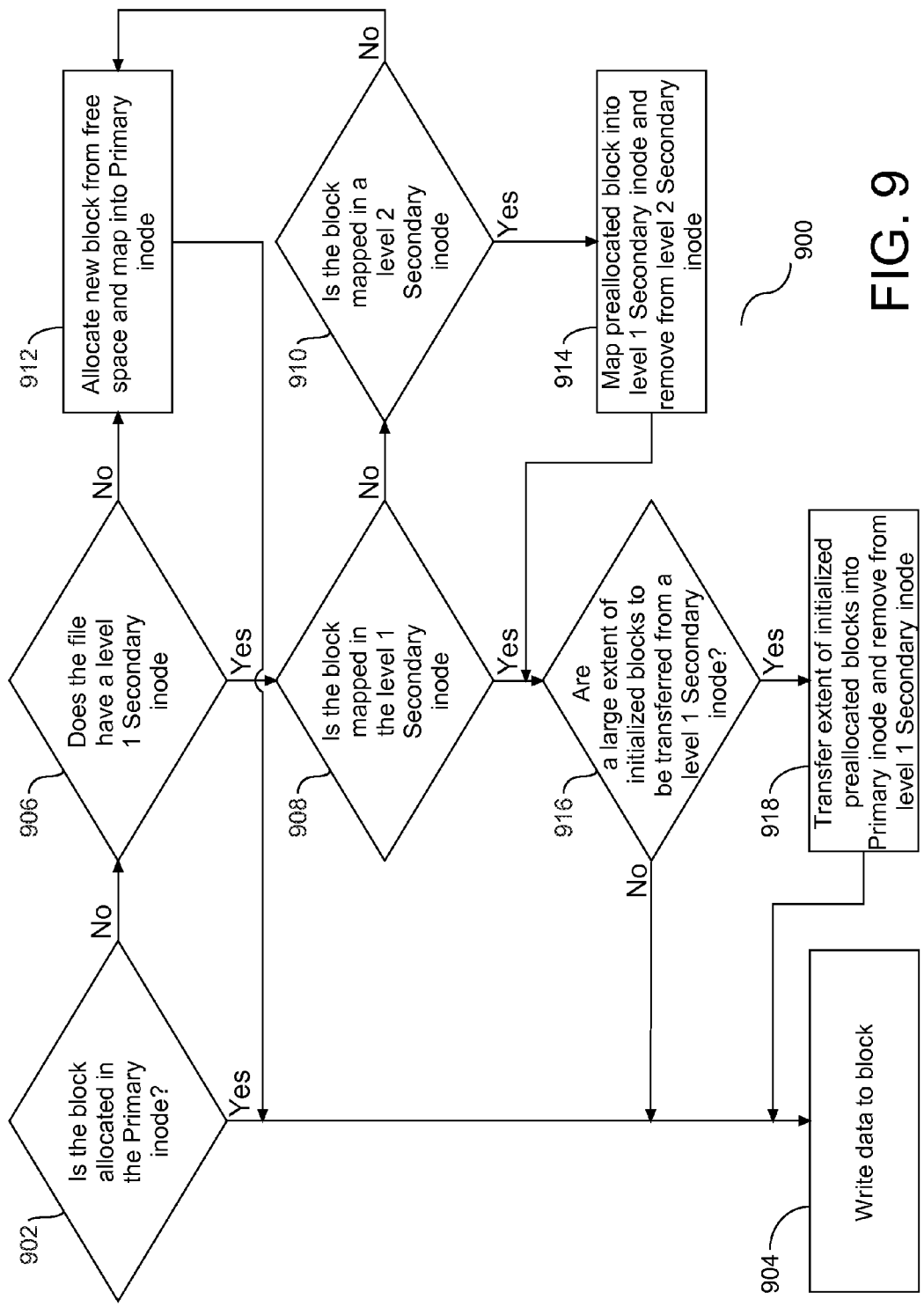
FIG. 9 is a flow chart illustrating an alternative process for deferred block transfer during a write procedure with a set of first and second level secondary i-nodes.

It will be appreciated that, although specific embodiments of the invention have been described herein for purposes of illustration, various modifications may be made without departing from the spirit and scope of the invention. An extent mapped i-node is an i-node with data blocks that are referenced in contiguous sets, with each set defined by a starting block address for that set and a length of the set. In contrast, a block mapped i-i-node is an i-node with referenced data blocks that may or may not be contiguous sets and do not contain a fixed length of a set of blocks. In one embodiment, a set of block mapped secondary i-nodes may be provided for each extent mapped primary i-node, i.e. contiguous set of blocks mapped to the primary i-node. More specifically, an extent mapped primary i-node is backed by a block mapped first level secondary i-node. The first level secondary i-node appears as a sparse file which maps only initialized blocks in a pre-allocated range. The first level secondary i-node is backed by a second level secondary i-node which maps pre-allocated but non-initialized blocks. In one embodiment, the first level secondary i-node has a shifted offset mapping to avoid the need for deeply nested indirect blocks in large files with a relatively smaller range of pre-allocated but non-initialized blocks. FIG. 9 is a flow chart (900) illustrating data block transfers in conjunction with the first and second level secondary i-nodes. The first step is a determination as to whether the target or select blocks being written to in the file is allocated in the primary i-node (902). If the response to the determination at step (902) is positive, the application writes data to the allocated block (904). However, if the response to the determination at step (902) is negative, this is an indication that a block allocation is necessary. Once it has been determined that a block allocation is necessary, it is determined whether the primary i-node of the associated file has a first level secondary i-node (906). If the response to the determination at step (906) is positive, it is subsequently determined whether the requested block is mapped in the first level secondary i-node (908). A negative response to in step (908) will result in a determination as to whether the requested block is mapped in the second level secondary i-node (910). A negative response to the determinations at steps (906) or (910) results in an allocation of a new block from the file system free space, and mapping of the new block into the primary i-node (912). Following the allocation at step (912), the application writes data to the allocated block (904). However, if the response to the determination step (910) is positive, the requested block is mapped into the first level secondary i-node and removed from the second level secondary i-node (914). Following step (914) or a positive response to the determination at step (908), it is determined whether a contiguous set of initialized blocks that exceeds a particular threshold are subject to transfer from the first level secondary i-node to the primary i-node (916). If the response to the determination at step (916) is negative, the application writes data to the allocated block (904). However, if the response to the determination at step (916) is positive, the extent of the initialized pre-allocated blocks are transferred from the first level secondary i-node to the primary i-node, followed by removal of the data blocks from the first level secondary i-node (918). Thereafter, the application writes data to the allocated block (904). The configuration of a set of secondary i-nodes supports extent mapped files in a way that avoids the problem of potential fragmentations of an extent map during random write procedures in a pre-allocated range.

In another embodiment, the data structure mapping the secondary i-node to data blocks may differ from ext3's direct and indirect block scheme. Likewise, an alternate mapping record may be used where supported, instead of an entire secondary i-node. Similarly, in one embodiment, the i-node may be replaced with an object in a file system that represents a file. Accordingly, the scope of protection of this invention is limited only by the following claims and their equivalents.

We claim:
1. A computer implemented method for persistent pre-allocation of data blocks comprising:
maintaining a first i-node for a file to manage file operations on a file server, said first i-node having initialized blocks;
associating said first i-node with a second i-node, including creating said second i-node for said file, establishing a relationship between primary and secondary nodes for the file, and allocating pre-allocated blocks into the second i-node; and
using a processor for transferring corresponding blocks from said second i-node to said first i-node responsive to a write operation requiring non-initialized blocks in a pre-allocated range of blocks, wherein said block transfer includes a contiguous block allocation for said file.
2. The method of claim 1, further comprising creating said second i-node and associating said second i-node with said first i-node if said second i-node is absent for a specified file.
3. The method of claim 2, further comprising allocating a range of specified blocks for said second i-node.
4. The method of claim 1, wherein the step of transferring corresponding blocks from said second i-node to said first i-node includes transferring a mapping for said blocks from said second i-node to said first i-node.
5. The method of claim 4, wherein the step of transferring blocks from said second i-node to said first i-node includes validating said second i-node prior to said transfer.
6. The method of claim 1, wherein said mapping technique includes system extended attributes.
7. A computer system comprising:
a processor in communication with memory;
a file system to log metadata;
a file having a first i-node in the file system to manage file operations, said first i-node having initialized blocks;
an allocation manager in the file system to associate the first i-node with a second i-node, including creation of the second i-node for the file, to establish a relationship between first and second i-nodes for the file, and allocation of pre-allocated blocks in the second i-node, and
said allocation manager to direct transfer of blocks from said second i-node to said first i-node in response to a requirement for non-initialized blocks in a pre-allocated range of blocks present on said second i-node in a write operation, wherein said block transfer includes a contiguous block allocation for said file.
8. The system of claim 7, further comprising a file system manager to create said second i-node for a specified file and to associate said second i-node with said first i-node if it is determined that said second i-node is absent for a specified file.
9. The system of claim 8, wherein said file system manager allocates a range of specified blocks for said created second i-node.
10. The system of claim 7, wherein said allocation manager transfers corresponding 2 blocks from said second i-node to said first i-node, and transfers a mapping for said blocks from said second i-node to said first i-node.
11. The system of claim 10, wherein said allocation manager validates presence of said second i-node in said file system prior to said transfer.
12. The system of claim 7, wherein said mapping technique includes system extended attributes.

13. An article comprising:
a tangible computer readable data storage media including computer program instructions configured to pre-allocate data blocks to a file in conjunction with a first i-node to manage file operations and a second i-node having pre-allocated non-initialized blocks, comprising:
instructions to associate said first i-node with said second i-node through a mapping technique; and
instructions to transfer corresponding blocks from said second i-node to said first i-node in response to a write operation requiring non-initialized blocks in a pre-allocated range of blocks absent from said first i-node, wherein said block transfer includes a series of blocks having a continuous connection.

14. The article of claim 13, further comprising instructions to create said second i-node and to associate said second i-node with said first i-node if said second i-node is absent for a specified file.

15. The article of claim 14, further comprising instructions to allocate a range of specified blocks for said second i-node.

16. The article of claim 13, wherein the instructions to transfer corresponding blocks from said second i-node to said first i-node includes transferring a mapping for said blocks from said second i-node to said first i-node.

17. The article of claim 16, wherein the instructions to transfer blocks from said second i-node to said first i-node includes instructions to validate said second i-node prior to said transfer.

18. The article of claim 13, wherein said mapping technique includes system extended attributes.

19. A computer implemented method for persistent pre-allocation of data blocks comprising:
maintaining a primary i-node for a file to manage file operations on a file server, said primary i-node having a contiguous set of mapped data blocks;
for said file backing said primary i-node with a first level secondary i-node for mapping initialized data blocks in a pre-allocated range;
backing said first level secondary i-node with a second level secondary i-node for mapping pre-allocated non-initialized data blocks;
associating said primary i-node with said first level secondary i-node, and associated said first level secondary i-node with said second level secondary i-node through a mapping technique; and
using a processor transferring corresponding data blocks from said second level secondary i-node to said first level secondary i-node, and transferring a contiguous set of initialized pre-allocated data blocks from said first level secondary i-node to said primary i-node responsive to a write operation.

* * * * *